US008777154B2

(12) United States Patent
Alexander et al.

(10) Patent No.: US 8,777,154 B2

(45) Date of Patent: Jul. 15, 2014

(54) APPARATUS AND METHOD FOR PREVENTING GAS TURBINE ENGINE FREEZING

(75) Inventors: Eric J. Alexander, San Diego, CA (US); Anthony C. Jones, San Diego, CA (US)

(73) Assignee: United Technologies Corporation, Hartford, CT (US)

(*) Notice: Subject to any disclaimer, the term of this patent is extended or adjusted under 35 U.S.C. 154(b) by 130 days.

(21) Appl. No.: 13/544,264

(22) Filed: Jul. 9, 2012

(65) Prior Publication Data

US 2014/0008497 A1 Jan. 9, 2014

(51) Int. Cl.
*B64D 33/02* (2006.01)

(52) U.S. Cl.
USPC .......................... 244/53 B; 244/1 R; 89/1.817

(58) Field of Classification Search
USPC ....... 244/53 B, 121, 137.4, 1 R, 137.1, 129.1, 244/129.4; 60/39.08, 806, 796, 798, 758; 89/1.8, 1.816, 1.817
See application file for complete search history.

(56) References Cited

U.S. PATENT DOCUMENTS 3,020,710 A * 2/1962 Herzog .......... 60/770
3,115,010 A * 12/1963 Collier .......... 60/200.1
3,646,980 A * 3/1972 Peterson .......... 244/129.4
4,456,203 A 6/1984 Louthan
H213 H * 2/1987 Panlaqui .......... 89/1.8
5,514,035 A 5/1996 Denniston
5,660,357 A * 8/1997 Grossman et al. .......... 244/121
6,123,005 A * 9/2000 Kuchta et al. .......... 89/1.817
6,138,950 A * 10/2000 Wainfan et al. .......... 244/53 B
6,871,819 B2 * 3/2005 Garric .......... 244/53 B
7,140,289 B1 * 11/2006 Ansay et al. .......... 89/1.809
7,194,866 B1 3/2007 Jones et al.
7,625,415 B2 * 12/2009 Durocher et al. .......... 55/306
8,256,340 B2 * 9/2012 Bohs et al. .......... 89/1.816
8,516,785 B2 * 8/2013 Brown .......... 60/39.092
2002/0146315 A1 10/2002 Rockwood
2004/0083878 A1 * 5/2004 Paul .......... 89/1.817
2004/0195437 A1 * 10/2004 Garric .......... 244/53 B
2006/0207416 A1 * 9/2006 Bohs et al. .......... 89/1.16
2007/0028589 A1 2/2007 Alexander et al.
2008/0135336 A1 6/2008 Jewess et al.
2009/0223184 A1 * 9/2009 Pavlatos .......... 55/306
2010/0127115 A1 * 5/2010 Adir .......... 244/52
2010/0282055 A1 * 11/2010 Jansson .......... 89/1.817

FOREIGN PATENT DOCUMENTS

KR 20-0340561 Y1 2/2004

OTHER PUBLICATIONS

International Search Report and Written Opinion from PCT Application Serial No. PCT/US2013/049577, dated Sep. 17, 2013, 9 pages.

* cited by examiner

*Primary Examiner* — Christopher P Ellis
*Assistant Examiner* — Medhat Badawi
(74) *Attorney, Agent, or Firm* — Kinney & Lange, P.A.

(57) ABSTRACT

A system for reducing moisture in a gas turbine engine with one or more air ducts includes one or more one or more covers, each with an outer face and an inner face, with the inner face connectable to the air duct, wherein the cover is shaped to engage and close the air duct and a desiccant that is attachable to the cover.

17 Claims, 6 Drawing Sheets

APPARATUS AND METHOD FOR PREVENTING GAS TURBINE ENGINE FREEZING

BACKGROUND

The present invention relates to gas turbine engines, and in particular, to miniature gas turbine engines being used in aeronautical vehicles.

Miniature gas turbine engines are often utilized in single-usage applications such as reconnaissance drones, cruise missiles, decoy and other weapon applications, including air-launched and ground-launched weapon systems. The use of such an engine greatly extends the range of such vehicles in comparison to the more conventional solid fuel rocket engine.

Miniature gas turbine engines are often stored for periods of time before use. During this time, there is a risk that environmental factors may contaminate the miniature gas turbine engine. A specific concern is that moisture may settle in the miniature gas turbine engine. Because of this threat, miniature gas turbine engines are sometimes stored in canisters. The canisters are meant to protect the engine from outside elements. Aeronautical vehicles have to be removed from their canisters prior to being launched. It is typical for aeronautical vehicles to be removed from their canisters at ground level and then be carried to many different elevations before they are launched. Aeronautical vehicles typically remain outside their canisters for long periods of time, increasing their exposure to moisture.

SUMMARY

A system for reducing moisture build-up in gas turbine engines with an air inlet and an exhaust outlet includes a cover to be placed on an air inlet and/or an exhaust outlet, a desiccant that is attachable to the cover, and a means for removing the cover. The cover includes an inner face and an outer face, with the desiccant being located on the inner face, and is connectable to either the air inlet and/or the exhaust outlet.

A method for preventing moisture build-up in gas turbine engines when not in use includes mounting a desiccant on an inner surface of a cover, sealing the cover over a duct opening of a gas turbine engine, and removing the cover from the gas turbine engine when the gas turbine engine is to be started.

DETAILED DESCRIPTION

In general, the present invention prevents moisture build-up in gas turbine engines by sealing the inlet and exhaust openings of a gas turbine engine with a cover. The cover prevents humidity from entering into the gas turbine engine. A desiccant attached to the cover will absorb any built-up moisture in the gas turbine engine.

Figure 1:
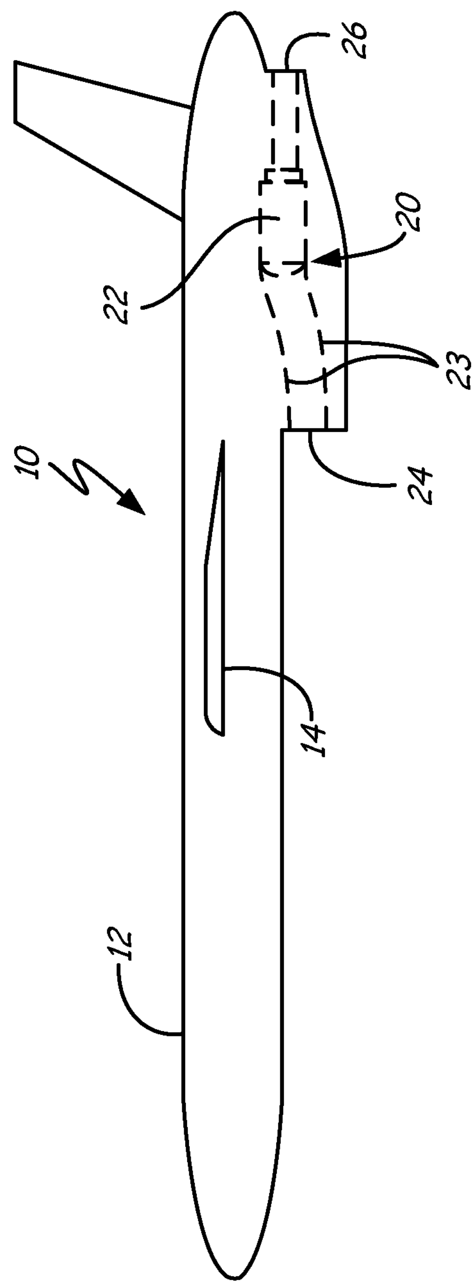
FIG. 1 is a side view of an aeronautical vehicle.

FIG. 1 is a side view of aeronautical vehicle 10. Aeronautical vehicle 10 includes airframe 12, with one or more aerodynamic surfaces 14. Vehicle 10 also includes propulsion system 20 with propulsion engine 22, air inlet 24 and exhaust outlet 26. Propulsion engine 22 is housed within airframe 12. Air inlet 24 is connected to propulsion engine 22 at a first intake end, as shown by dashed lines 23. Exhaust outlet 26 is connected to the opposite exhaust end of propulsion engine 22.

Propulsion system 20 propels aeronautical vehicle 10. Ambient air is ingested by air inlet 24 and is passed to propulsion engine 22. Propulsion engine 22 compresses the air in a compressor section, mixes the compressed air with fuel and ignites the fuel/air mixture in a combustor section to produce combustion gases, and routes the combustion gases through a turbine section to exhaust outlet 26. The combustion gases cause rotation of rotor blades of the turbine section, which in turn causes rotation of rotor blades of the compressor section. Exhausted combustion gases and air provide thrust that propel aeronautical vehicle 10.

Figure 2A:
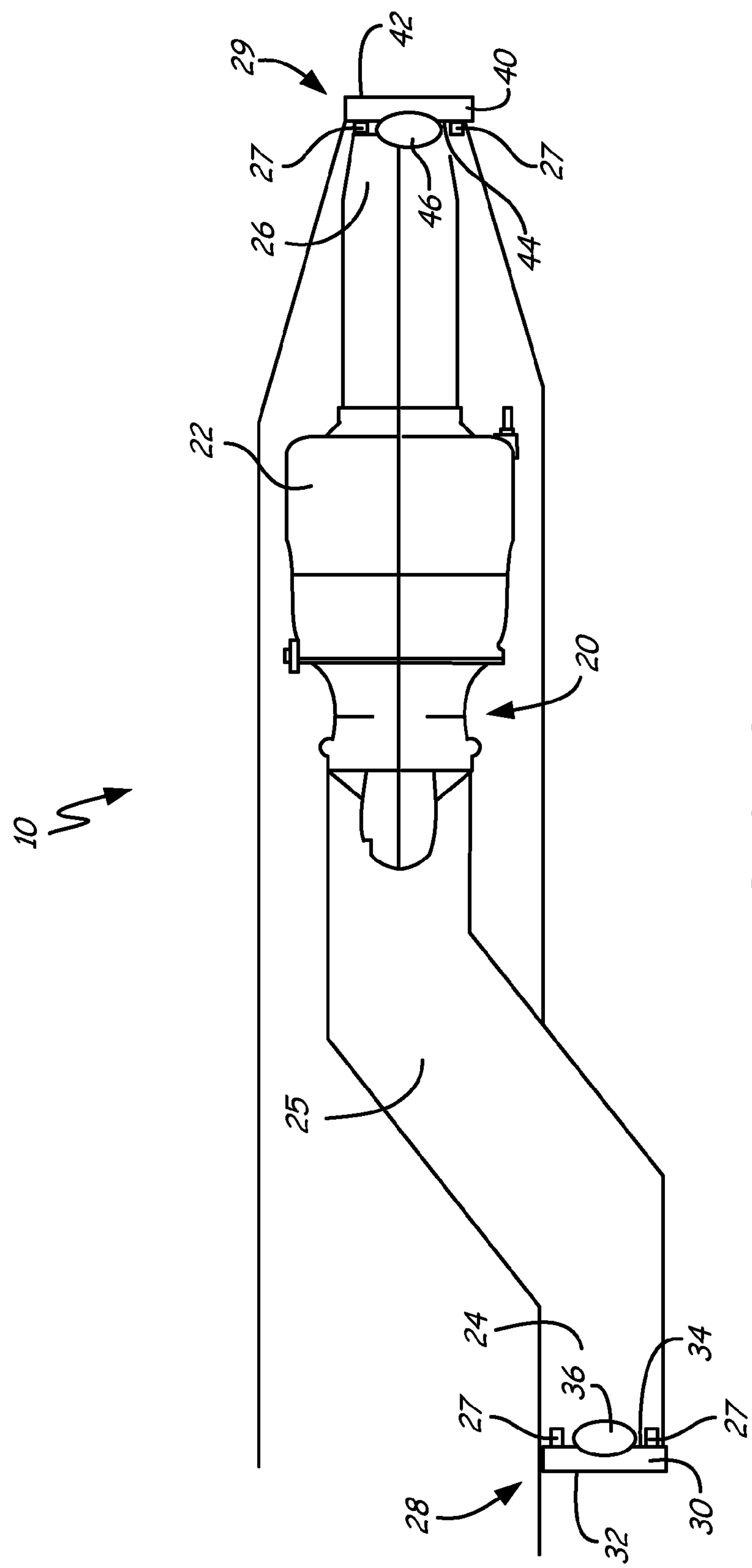
FIGS. 2A is a cut-away side view of a propulsion system for the aeronautical vehicle shown in FIG. 1, showing covers located at the air inlet and the exhaust outlet.
Figure 2B:
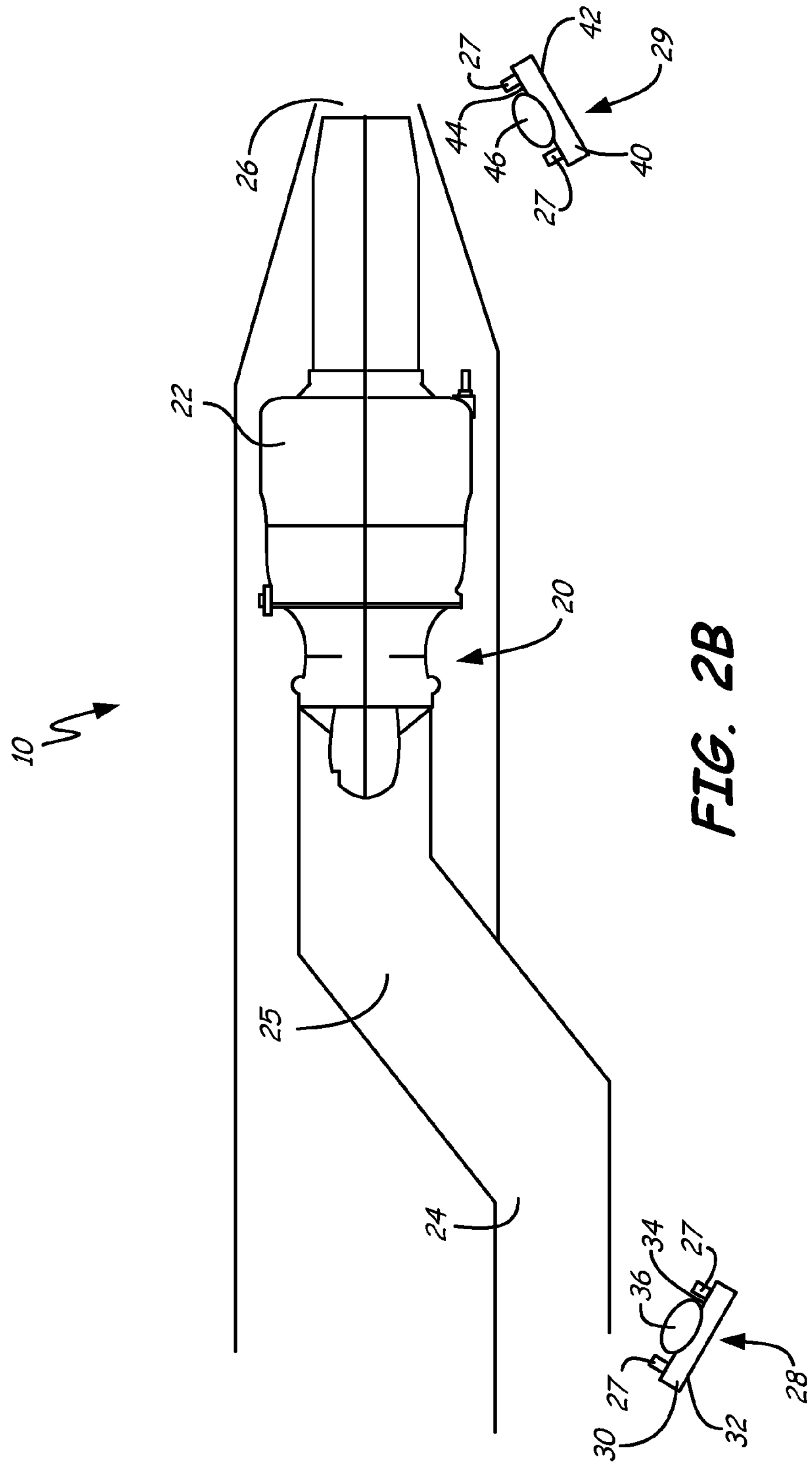
FIG. 2B is a cut-away side view of the propulsion system of FIG. 2A, showing the covers being blown off.
Figure 2C:
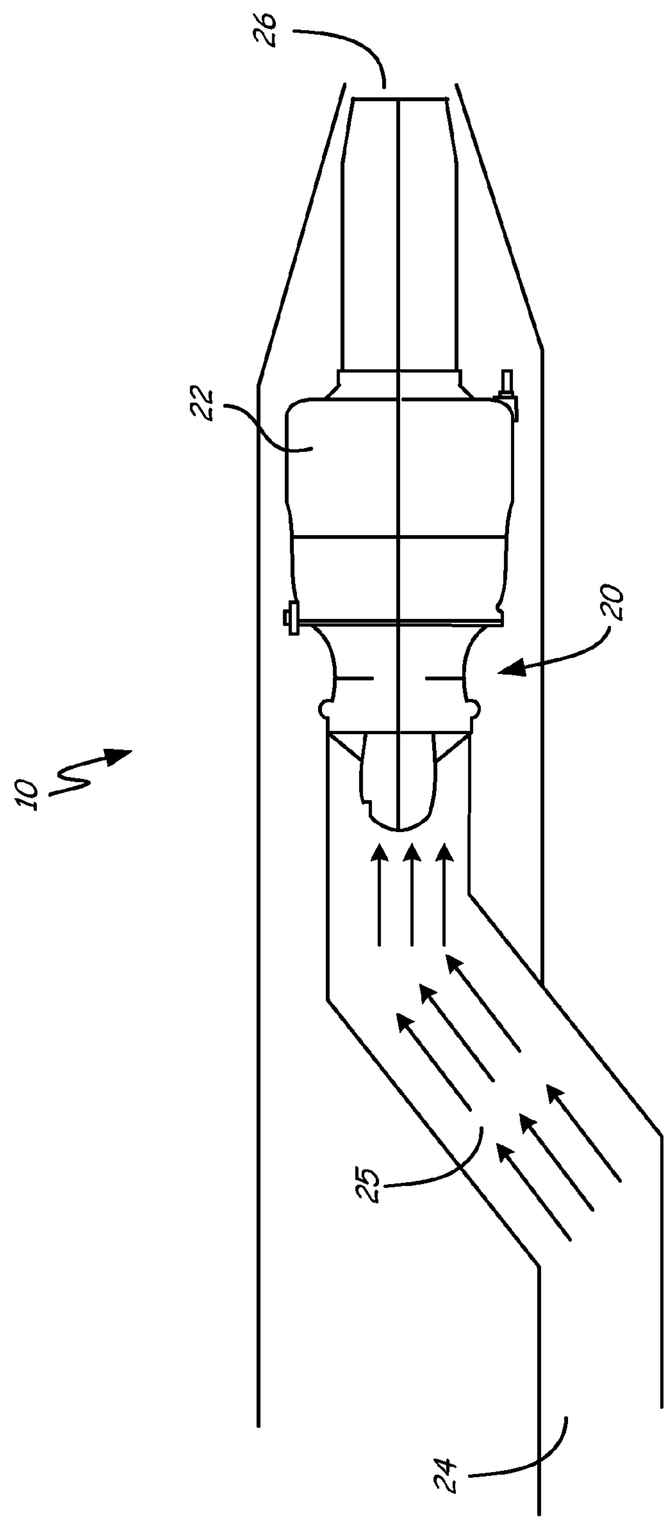
FIG. 2C is a cut-away side view of the propulsion system of FIG. 2A, after the covers have been completely removed.

FIGS. 2A-2C are cut-away side views of the aft section of aeronautical vehicle 10 with a side view of propulsion system 20. FIG. 2A shows covers attached to air inlet 24 and exhaust outlet 26; FIG. 2B shows the covers being blown off aeronautical vehicle 10; and FIG. 2C shows propulsion system 20 after the covers have been completely removed. Propulsion system 20 includes propulsion engine 22, air inlet 24, exhaust outlet 26, inlet cover 28, outlet cover 29, pyrotechnics 27 and air duct 25. Inlet cover 28 includes body 30, outer face 32, inner face 34 and desiccant 36. Outlet cover 29 includes body 40, outer face 42, inner face 44 and desiccant 46. Covers 28 and 29 can be made of a phenolic material, aluminum, plastic or any other suitable material. Desiccants 36 and 46 can include silica gel, activated charcoal, calcium sulfate, calcium chloride, montmorillonite clay or a molecular sieve, although any suitable hygroscopic substance can be used.

Air duct 25 has one end connected to air inlet 24 its opposite end connected to propulsion engine 22. Desiccant 36 is attached to inner face 34 of inlet cover 28, and desiccant 46 is attached to inner face 44 of outlet cover 29. Pyrotechnics 27 are attached to inlet cover 28, located between inlet cover 28 and air inlet 24, and to outlet cover 29, located between outlet cover 29 and exhaust outlet 26. Inlet cover 28 can be placed on air inlet 24, with inner face 34 connecting to air inlet 24. Outlet cover 29 can be placed on exhaust outlet 26, with inner face 44 connecting to exhaust outlet 26.

Inner face 34 of inlet cover 28 can be sealingly attached to air inlet 24, and inner face 44 of outlet cover 29 can be sealingly attached to exhaust outlet 26, preventing any foreign matter from entering into propulsion system 20. Desiccants 36 and 46 attached to inner faces 34 and 44, respectively, can absorb moisture that gets induced from the environment into propulsion system 20.

Pyrotechnics 27 are remotely activated when aeronautical vehicle 10 is launched, thus blowing inlet cover 28 and outlet cover 29 off of air inlet 24 and exhaust outlet 26, respectively. Inlet cover 28 and outlet cover 29 are blown off of aeronautical vehicle 10 in full, preventing a part of either inlet cover 28 or outlet cover 29 from being ingested by propulsion system 20. After inlet cover 28 and outlet cover 29 are blown off of the engine, air inlet 24 can ingest ambient air. Ambient air flows into air inlet 24 through air duct 25 to propulsion engine 22, as shown by the arrows in FIG. 2C. Propulsion engine 22 can then create thrust that is expelled out of exhaust outlet 26, propelling aeronautical vehicle 10.

As mentioned above, aeronautical vehicles can be stored in canisters for extended periods of time, and must be removed once they are slated for use. Moisture can enter into the propulsion system after the aeronautical vehicle has been taken out of its canister by entering through the air inlet or the exhaust outlet. The foreign matter that enters into the system can have damaging effects on the gas turbine engine. Moisture that gets into the engine, for example as humid air when the aeronautical vehicle is on the ground, can cause freezing on or within the engine at high altitudes and low temperatures, which could cause propulsion engine 22 to not start or to malfunction.

Inlet cover 28 and outlet cover 29 prevent moisture, particulate matter or any foreign object from entering air inlet 24 or exhaust outlet 26, thus creating a sealed and reduced moisture environment through the use of desiccants 36 and 46 in combination with covers 28 and 29. This prevents moisture from settling in propulsion engine 22 when it is not in use prior to it being launched. Desiccants 36 and 46 keep propulsion system 20 dry by absorbing any moisture that gets into or remains in propulsion system 20 after inlet cover 28 and outlet cover 29 are placed on air inlet 24 and exhaust outlet 26, respectively. Preventing moisture from getting into propulsion system 20 reduces the risk of engine freezing. This can improve engine reliability.

A method for reducing moisture build-up in a gas turbine engine includes mounting a desiccant to an inner surface of a cover, sealing the cover over a duct opening of a gas turbine engine, and removing the cover from the gas turbine engine when the gas turbine engine is to be started.

First, a desiccant is mounted to an inner surface of a cover. A first embodiment includes attaching the desiccant to the cover with an adhesive, when the adhesive is located between the desiccant and the inner surface of the cover. In an alternate embodiment, the desiccant can be attached to the inner surface of the cover with one or more fasteners, the fasteners being placed through the desiccant and entering into the body of the cover through the inner surface. The desiccant can be attached to the cover structure in any number of ways, with only two exemplary embodiments being shown here. The desiccant is integrated into the inner surface of the cover so it will be enclosed within a system when the cover is placed on a duct opening, allowing the desiccant to absorb any moisture in the system.

Second, the cover is sealed over a duct opening of a gas turbine engine. The cover can be secured to the duct opening in many ways. One embodiment would include casting the cover to fit sealingly around the duct opening. An alternate embodiment would be to attach the cover to the duct opening with one or more fasteners.

Sealing covers to the duct openings of the gas turbine engine will close the gas turbine engine system. This will prevent any moisture, particulate matter or foreign objects from entering the gas turbine engine and it will allow the desiccant that is attached to the inner surface of the cover to absorb any moisture that remains in the system. Maintaining a dry and uncontaminated system is important for having a reliable and effective gas turbine engine.

Third, the covers can be removed from the gas turbine engine when the engine is to be started. The covers can be removed in a number of ways. One embodiment includes employing pyrotechnics that can be remotely activated to blow the covers off of the duct openings of the gas turbine engine prior to starting to the gas turbine engine. In other embodiments, covers could also be removed through the use of any suitable mechanical or electromechanical actuators.

Figure 3:
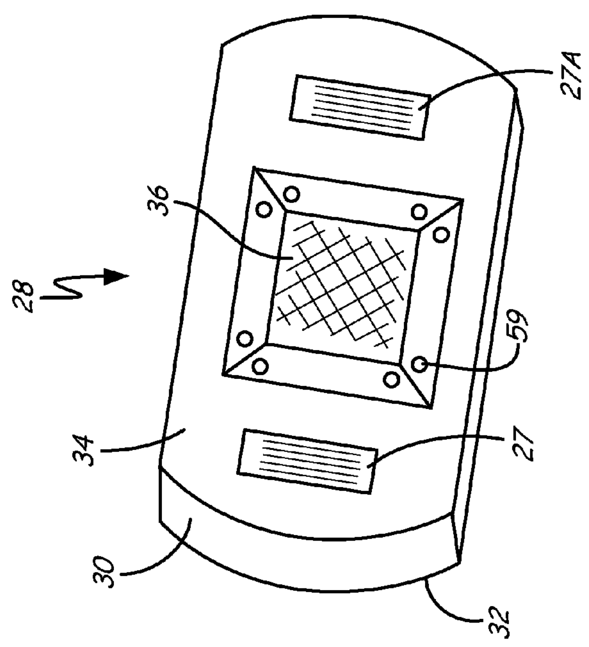
FIG. 3 is an inner perspective view of an air inlet cover.

FIG. 3 is an inner perspective view of inlet cover 28. Inlet cover 28 includes body 30, outer face 32, inner face 34, desiccant 36 and pyrotechnics 27. Desiccant 36 is attached to inner face 34 of inlet cover 28 with fasteners 59. Pyrotechnics 27 are located on inner face 34 of inlet cover 28.

Inner face 34 of inlet cover 28 can be sealingly connected to air inlet 24. This allows desiccant 36 to absorb any moisture that is retained in propulsions system 20. Inlet cover 28 can be any size or shape in order to accommodate different air intakes.

Figure 4A:
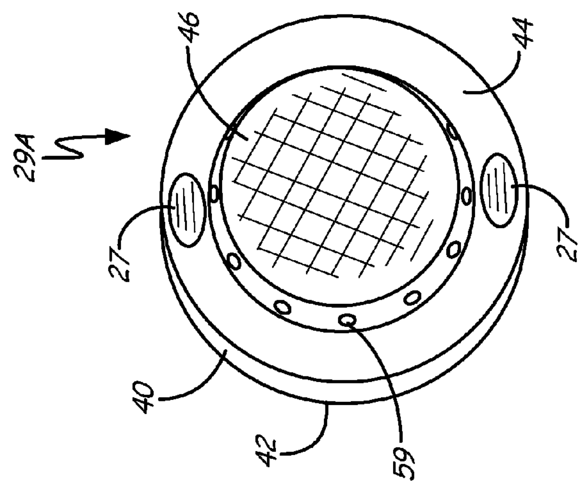
FIG. 4A is an inner perspective view of a first embodiment of an exhaust outlet cover.
Figure 4C:
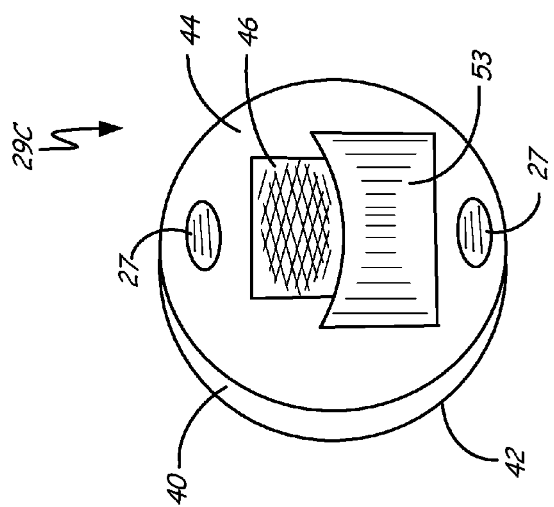
FIG. 4C is an inner perspective view of a third embodiment of an exhaust outlet cover.
Figure 4B:
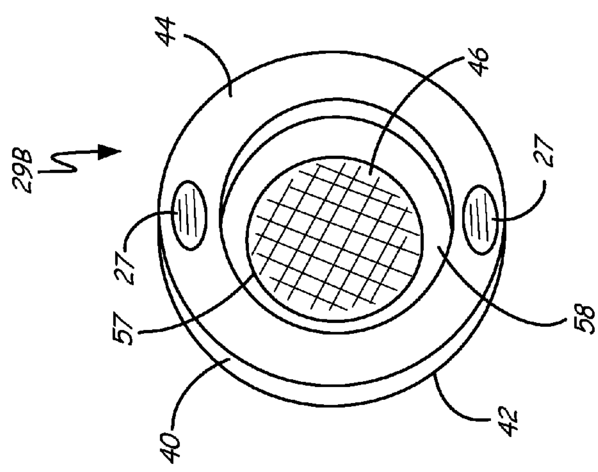
FIG. 4B is an inner perspective view of a second embodiment of an exhaust outlet cover.

FIGS. 4A-4C are inner perspective views of outlet cover 29. FIG. 4A shows desiccant 46 attached to outlet cover 29A with one or more fasteners 59. FIG. 4B shows desiccant 46 attached to outlet cover 29B with adhesive 57. FIG. 4C shows outlet cover 29C with pocket 53 for holding desiccant 46. Cover 29 has body 40, outer face 42, inner face 44, desiccant pack 46 and pyrotechnics 27. FIG. 3B shows outlet cover 29B with recess 58. Recess 58 is located on inner face 44 of outlet cover 29B. FIG. 3C shows outlet cover 29C with pocket 53. Pocket 53 is located on inner face 44 of outlet cover 29C.

FIG. 4A shows desiccant pack 46 attached to outlet cover 29A through the use of one or more fasteners 59. Fastener 59 can be a nut, bolt, screw or any other suitable fastener. FIG. 4B shows desiccant pack 46 placed in recess 58 of outlet cover 29B. Desiccant pack 46 is attached to outlet cover 29B through the use of adhesive 57. Adhesive 57 or fastener 59 can secure desiccant 46 to inner face 44 or recess 58 of outlet cover 29.

FIG. 4C shows outlet cover 29C with pocket 53. Desiccant 46 can be placed in pocket 53. Pocket 53 can be attached to inner face 44 by any suitable means. Pocket 53 can be made of any material that will allow moisture to pass through.

As shown in FIGS. 2A-2C, inlet cover 28 and outlet cover 29 can be placed on an inlet or outlet to prevent moisture from entering into propulsion system 20. Inner faces 34 and 44 will come into contact with the inlet or outlet, thus allowing desiccants 36 and 46 to absorb any moisture from the system. Preventing moisture build-up in propulsion system 20 during periods of storage or non-use is important so that propulsion engine 22 can operate properly when needed to propel aeronautical vehicle 10.

Reducing the moisture that is in the environment of a gas turbine engine during storage/non-use will help to prevent the engine from freezing. The cover is placed on the duct openings of the gas turbine engine to prevent moisture, particulate matter and foreign objects from entering into and contaminating the gas turbine engine. Further, the desiccant that is located on the cover structure will absorb any moisture that remains in the gas turbine engine to prevent any moisture build-up. This will prevent the gas turbine engine from freezing, which will increase the effectiveness and reliability of the gas turbine engine.

While a cover for a miniature gas turbine engine with desiccant has been shown, other moisture reducing materials could be used. Additionally, the shape, connection and/or size of covers and desiccant shown are for example purposes only and can vary according to system requirements.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:

1. A system comprising:

a gas turbine engine including an air duct;

a cover with an outer face and an inner face, with the inner face connectable to the air duct, wherein the cover is shaped to engage and close the air duct;

pyrotechnics attached to the cover and positioned within the air duct when the cover is engaged with the closes the air duct; and a desiccant secured to the cover, wherein the desiccant is positioned within the air duct when the cover is engaged with and closes the air duct.

2. The system of claim 1, wherein the desiccant is a desiccant pack attached to the cover.

3. The system of claim 1, wherein the desiccant is located on the inner face of the cover.

4. The system of claim 1, wherein the cover has a recess on the inner face of the cover.

5. The system of claim 4, wherein the desiccant is attached to the recess of the cover through the use of a fastener.

6. The system of claim 4, wherein the desiccant is attached to the recess of the cover through the use of an adhesive.

7. The system of claim 1, wherein the cover has a pocket on the inner face of the cover, the pocket made of a moisture permeable material, and wherein the desiccant pack is secured at least partially within the pocket.

8. An aeronautical vehicle comprising:

an airframe;

a gas turbine engine mounted to the airframe to propel the aeronautical vehicle;

an inlet to introduce air to the gas turbine engine;

an exhaust outlet to allow exhaust from the gas turbine engine to ambient;

a first cover sealing the inlet;

a second cover sealing the exhaust outlet;

means for pyrotechnically removing the first and second covers from the inlet and the exhaust outlet, respectively, via remote activation; and a moisture reducing medium attached to the first cover and the second cover, wherein the moisture reducing medium is positioned within the exhaust outlet when the second cover is engaged with and closes the exhaust outlet.

9. The aeronautical vehicle of claim 8, wherein the moisture reducing medium is desiccant.

10. The aeronautical vehicle of claim 8, wherein the moisture reducing medium is located on the inner face of the cover.

11. The aeronautical vehicle of claim 8, wherein the cover has a recess on the inner face of the cover.

12. The aeronautical vehicle of claim 11, wherein the moisture reducing medium is integrated into the recess of the cover.

13. A method comprising:

mounting a desiccant to an inner surface of a cover;

sealing the cover over a duct opening of a gas turbine engine to maintain the gas turbine engine in a sealed, reduced moisture environment during a period of storage or non-use;

including pyrotechnics on the cover, the pyrotechnics configured to remove the cover from the gas turbine engine prior to the gas turbine engine being started by blowing the cover off of the gas turbine engine.

14. The method of claim 13, wherein the step of mounting a desiccant to an inner surface of a cover further comprises:

integrating the desiccant into the cover structure with a fastener.

15. The method of claim 13, wherein the step of mounting a desiccant to an inner surface of a cover further comprises:

integrating the desiccant into the cover structure with an adhesive.

16. The method of claim 13 and further comprising:

removing the gas turbine engine from a canister prior to removing the cover from the gas turbine engine.

17. The aeronautical vehicle of claim 8, wherein the first cover has a pocket on the inner face of the first cover, the pocket made of a moisture permeable material, and wherein the moisture reducing medium is secured at least partially within the pocket.

* * * * *

UNITED STATES PATENT AND TRADEMARK OFFICE

CERTIFICATE OF CORRECTION

PATENT NO. : 8,777,154 B2
APPLICATION NO. : 13/544264
DATED : July 15, 2014
INVENTOR(S) : Eric J. Alexander et al.

It is certified that error appears in the above-identified patent and that said Letters Patent is hereby corrected as shown below:

In the Claims
Col. 5, Line 11
Delete “the”
Insert --and-- before “closes”

Signed and Sealed this
Fourteenth Day of October, 2014

Michelle K. Lee
*Deputy Director of the United States Patent and Trademark Office*